(12) United States Patent
Lebeau et al.

(10) Patent No.: US 11,160,216 B2
(45) Date of Patent: Nov. 2, 2021

(54) ROUND BALER WITH TAILGATE POSITION SENSOR AND METHOD OF OPERATING THE SAME

(71) Applicant: DEERE & COMPANY, Moline, IL (US)

(72) Inventors: Jonathan Lebeau, Dijon (FR);
Emmanuel Chapon, Velet (FR);
Jean-Alexis Mercier, Mirebeau (FR)

(73) Assignee: DEERE & COMPANY, Moline, IL (US)

( * ) Notice: Subject to any disclaimer, the term of this patent is extended or adjusted under 35 U.S.C. 154(b) by 296 days.

(21) Appl. No.: 16/393,252

(22) Filed: Apr. 24, 2019

(65) Prior Publication Data

US 2019/0350137 A1   Nov. 21, 2019

(30) Foreign Application Priority Data

May 18, 2018 (EP) .................................. 18173188

(51) Int. Cl.
*A01F 15/08* (2006.01)
*G01B 5/24* (2006.01)
(Continued)

(52) U.S. Cl.
CPC ............ *A01F 15/0883* (2013.01); *G01B 5/24* (2013.01); *A01D 43/006* (2013.01); *A01D 90/10* (2013.01);
(Continued)

(58) Field of Classification Search
CPC ...... A01F 15/0883; A01F 15/08; A01F 15/07; A01F 15/0715; A01F 15/0833;
(Continued)

(56) References Cited

U.S. PATENT DOCUMENTS

| 4,674,403 A | * | 6/1987 | Bryant | .................... A01F 15/07 |
| | | | | 100/4 |
| 4,855,924 A | * | 8/1989 | Strosser | .............. A01F 15/0833 |
| | | | | 700/117 |
| 7,331,279 B2 | * | 2/2008 | Biziorek | ................. A01F 15/07 |
| | | | | 100/48 |

(Continued)

FOREIGN PATENT DOCUMENTS

| EP | 1593299 A1 | 11/2005 |
| EP | 3087827 A1 | 11/2016 |
| WO | 201 1012956 A2 | 2/2011 |

OTHER PUBLICATIONS

European Search Report issued in counterpart application No. 18173188.6 dated Nov. 15, 2018. (5 pages).

*Primary Examiner* — Arpad Fabian-Kovacs

(57) ABSTRACT

A round baler includes a pick-up unit for picking up crop material from the ground, a baling chamber which receives the crop material from the pick-up unit, and a press mounted within the baling chamber for forming a bale during a bale formation cycle. The baler also includes a binding unit for dispensing a binding material for binding the bale, a tailgate displaceable by an actuator from a closed position at the beginning of a bale formation cycle to an open position to dispense the bale after the binding cycle. A sensor detects a first tailgate position after the bale formation cycle and before the binding cycle, and detects a second tailgate position after the binding cycle and before displacing the tailgate to the opened position. A controller is responsive to the sensor by determining a tailgate position change between the second tailgate position and the first tailgate position.

17 Claims, 3 Drawing Sheets

(51) Int. Cl.
  *A01F 15/07* (2006.01)
  *A01D 90/10* (2006.01)
  *A01D 43/00* (2006.01)

(52) U.S. Cl.
  CPC ......... *A01F 15/0715* (2013.01); *A01F 15/085* (2013.01); *A01F 15/0833* (2013.01); *A01F 2015/076* (2013.01)

(58) Field of Classification Search
  CPC ... A01F 2015/076; G01B 5/24; A01D 43/006; A01D 90/10
  See application file for complete search history.

(56) References Cited

U.S. PATENT DOCUMENTS

| | | | | |
|---|---|---|---|---|
| 8,291,687 B2 * | 10/2012 | Herron | ................ | A01F 15/0705 56/341 |
| 8,746,137 B1 * | 6/2014 | Henry | ................ | A01F 15/0883 100/35 |
| 8,776,679 B1 * | 7/2014 | Henry | ................ | A01F 15/0883 100/2 |
| 9,622,417 B2 * | 4/2017 | Smith | ................ | A01F 15/0705 |
| 10,385,605 B2 * | 8/2019 | Limke | ................ | E05F 15/70 |
| 2002/0029542 A1 * | 3/2002 | Davis | ................ | A01F 15/0833 53/399 |
| 2007/0175198 A1 * | 8/2007 | Viaud | ................ | A01F 15/0833 56/341 |
| 2009/0107102 A1 * | 4/2009 | Biziorek | ............ | A01F 15/0883 56/341 |
| 2011/0023732 A1 * | 2/2011 | Herron | ................ | A01F 15/08 100/40 |
| 2011/0060507 A1 * | 3/2011 | Vanhercke | ............ | A01F 15/085 701/50 |
| 2012/0189417 A1 * | 7/2012 | Blough | ............... | A01F 15/0883 414/519 |
| 2012/0204736 A1 * | 8/2012 | Blough | ................ | B30B 9/3014 100/35 |
| 2015/0257340 A1 * | 9/2015 | Anstey | ................ | A01F 15/0883 701/49 |
| 2015/0272007 A1 * | 10/2015 | Smith | ................ | A01D 90/10 414/24.5 |
| 2016/0187185 A1 * | 6/2016 | Smith | ................ | A01F 15/0825 177/1 |
| 2021/0088059 A1 * | 3/2021 | Brewer | ................ | F15B 21/08 |

* cited by examiner

ROUND BALER WITH TAILGATE POSITION SENSOR AND METHOD OF OPERATING THE SAME

RELATED APPLICATIONS

This application claims priority to European Patent Application Ser. No. 18173188.6, filed May 18, 2018, the disclosure of which is hereby incorporated by reference in its entirety.

FIELD OF THE DISCLOSURE

The present disclosure relates to a round baler, and in particular to a round baler having a pick-up unit being operable to pick up crop material from the ground, a baling chamber receiving the crop material from said pick-up unit, a press device mounted within the baling chamber and being operable to form a bale in a bale formation cycle, a binding unit dispensing a binding material for binding the bale in a binding cycle, and a tailgate being displaceable by an actuator from a closed position at the beginning of a bale formation cycle to an opened position to dispense the bale after the binding cycle.

BACKGROUND

A baler includes a baling chamber where the agricultural residues from the farm are collected for binding and forming bales. The baler includes a press means or a press device, e.g., a plurality of press rolls or a press belt, which are transversely positioned within the baler. The press device are powered by a Power Take Off (PTO) shaft receiving torque from the engine of a vehicle for pulling the baler. Typically, the bales are bound with a binding material, e.g., twine or net, inside the bale forming chamber before being discharged on the ground or discharged for being wrapped by a wrapping material, such as, a polymeric sheet or film.

During bale formation, the agricultural residues in the bale forming chamber are required to be effectively pressed by the press device during a bale formation cycle. At the end of the bale formation cycle, the binding material is inserted into the baling chamber by a binding arrangement. Thereafter, the binding cycle is initiated wherein the bale is bound by the binding material. The bale is required to be properly bound by the binding material so as to avoid opening of the bale and falling of agricultural material on the ground or on baler components on the rear side of the baler or on the wrapping unit, in case of a combination baler (baler/wrapper). This causes inconvenience to the operator of the baler as the agricultural residue is required to be removed manually or to be picked-up again by the baler. In case of a combination baler, the agricultural material spilling on the baler and on the wrapping arrangement poses a lot of inconvenience as the operator is required to clear the agricultural material from the baler before proceeding further operating the baler.

Hence, there is a need for a round baler with a system for detecting completion of binding to prevent unloading of bale without proper binding.

SUMMARY

In the present disclosure, a round baler is provided with at least one sensor to detect a first tailgate position after the bale formation cycle and before the binding cycle, and to detect a second tailgate position after the binding cycle and before displacing the tailgate to the opened position. A controller responsive to at least one sensor to determine a tailgate position change between the second tailgate position and the first tailgate position. The controller is configured to display the tailgate position change in an indicating unit.

The sensor may be one of an angle sensor, a distance sensor or a pressure sensor. The sensor may be located proximate to the tailgate. Alternatively, the sensor may be located at the hinged point of the tailgate. Moreover, the sensor may be located at the end of the tailgate opposite the hinged point.

The sensor may be located proximate to the actuator. Alternatively, the sensor may be located proximate to the tailgate. The sensor may be located at the hinged point of the tailgate or the end of the tailgate opposite to the hinged point. The sensor may also be located in between the hinged portion of the tailgate and the end portion or at any other location where a tailgate opening can be detected or sensed.

The controller triggers the actuator to enable tailgate opening corresponding to the tailgate position change. Alternatively, the actuator may be manually actuated by an operator.

The controller may be designed to determine whether the tailgate position change is indicating a position change of the tailgate towards a closed position and to control the indicating unit to indicate that the binding cycle is complete. The indication may be an audio signal or a visual signal, wherein the indicating unit may be a speaker device or an indicating unit.

The controller may be designed to determine whether the tailgate position change is indicating a position change of the tailgate towards an opened position and to control the indicating unit to indicate that the binding cycle is incomplete. The indication may be an audio signal or a visual signal, wherein the indicating unit may be a speaker device or a display unit.

The tailgate may be automatically opened after completion of binding cycle is indicated by the controller. The tailgate may be alternatively opened by user intervention after completion of binding cycle is indicated by the controller.

In a further embodiment, a method of operating the above-mentioned round baler may include the steps of introducing a crop material into the baling chamber. Thereafter, a bale formation cycle may be initiated in the baling chamber of the round baler. A first position of the tailgate may be detected, at the end of the bale formation cycle after formation of a bale. After that, a binding cycle is initiated for binding the bale with a binding material. A second position of the tailgate, at the end of the binding cycle, may be detected. A tailgate position change may be determined based on the first tailgate position and the second tailgate position. The tailgate position change will be indicated on an indicating device, such as a speaker or a display unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
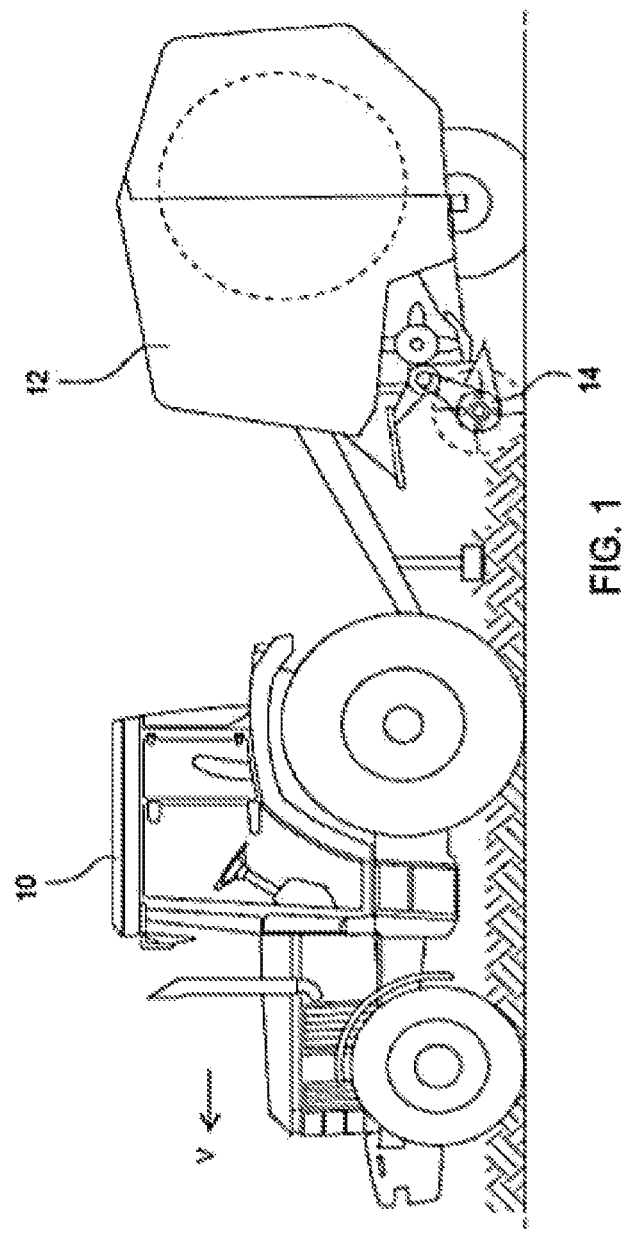
FIG. 1 illustrates a round baler towed by a tractor with a bale in a baling chamber of a round baler.

Referring to FIG. 1, a tractor (10) is used to tow a round baler (12) along the forward towing direction (V). Hereinafter, all indicated directions and location of the round baler (12), such as, forward, backward, rear, front, up, above, down, left and right shall be determined with reference to the forward towing direction (V) of the round baler (12) in the field. The round baler (12) includes a pick-up unit (14) and a feeding system provided at the front end of the round baler (12) to collect the residual product, such as hay and forage from the ground and convey it into the baling chamber (16). The round baler (12) is mounted on a support frame of a chassis and includes the baling chamber (16) with a plurality of press rolls. Although not shown in the figures, the baler (12) may be a combination baler including a wrapping device for wrapping the bale on the rear side of the baler.

The round baler (12) is powered by a Power Take-off (PTO) shaft (not shown in Figure) of the tractor (10). The PTO shaft (not shown in Figure) transmits a constant power from the engine for operating a press means or device. The press means or device may be a belt or a set of belts, a rod chain arrangement or, as shown in FIG. 1, press rolls. The plurality of press rolls is arranged to define the baling chamber (16) of the round baler (12). Each of the press rolls are configured to rotate about their respective axis. The rotation of the press rolls helps in bringing together the residual product, thereby enabling formation of bales. Although not illustrated, the press means or device may comprise press belts defining the baling chamber (16) of a variable chamber baler. On completion of the bale formation cycle, a bale binding cycle is initiated wherein the bale is bound with a binding material, such as, a twine or a net. After the binding cycle is completed, a tailgate (22) is opened to eject the bale bound by the binding material from the baling chamber (16).

Figure 2:
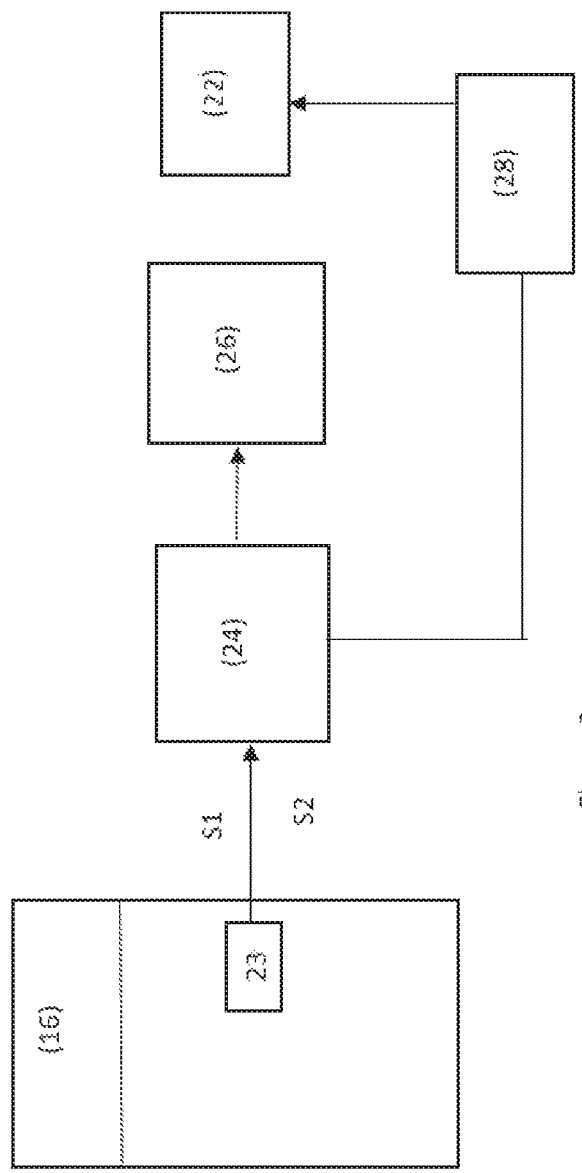
FIG. 2 illustrates a block diagram of the system, in accordance with the present disclosure.

FIG. 2 depicts a schematically illustrated baling chamber (16) having at least one sensor (23). The sensor (23) may be an angle sensor, a distance sensor or a pressure sensor or any other sensor useable for detecting a position change of the tailgate (22). The sensors (23) detects the position change on the tailgate (22) indicating a pressure change in the bale chamber (16) caused by bale formed during the binding cycle. The sensor (23) may be located at the hinged point of the tailgate. Alternatively, the sensor (23) may be located at the end of the tailgate opposite the hinged point.

After completion of the bale formation cycle, the bale has a first dimension. At this stage, due to the size of the bale, a force is exerted by the bale on the tailgate (22). This force tends to cause the tailgate to slightly move towards the opened position. The position into which the tailgate slightly moved (towards the opened position) at the end of bale formation cycle will henceforth be termed as the first tailgate position (S1). The first tailgate position (S1) is detected by the sensors (23).

As explained above, towards the end of completion of the baling formation the tailgate tends to open slightly caused by a pressure increase inside the bale chamber. After the completion of the baling formation cycle, the binding cycle initiates, wherein the bale is bound with the binding material. During the binding cycle, the binding material is tightly wound around the bale. This tends to compress the bale, such that, at the end of the binding cycle, the pressure or force applied on the tailgate (22) by the bale is reduced. This causes the tailgate to move slightly towards the closed position again. This position of the tailgate (22), into which the tailgate slightly moved (towards the closed position) at the end of the binding cycle, will henceforth be termed as second tailgate position (S2). The second tailgate position (S2) is detected by the sensors (23) to generate sensed signals corresponding the second tailgate position (S2), respectively.

The first tailgate position (S1) and the second tailgate position (S2) detected by the sensors (23) are transmitted to a controller (24). The controller (24) processes the signals for the first tailgate position (S1) and the second tailgate position (S2) to determine a tailgate position change (ΔS). This tailgate position change (ΔS) is displayed in the indicating unit (26). When after completing the binding cycle, the tailgate position change (ΔS) is indicating a position change of the tailgate towards the closed position of the tailgate, the controller (24) triggers the actuator (28) to open the tailgate (22) and allow the bale to be discharged from the baling chamber (16).

Figure 3:
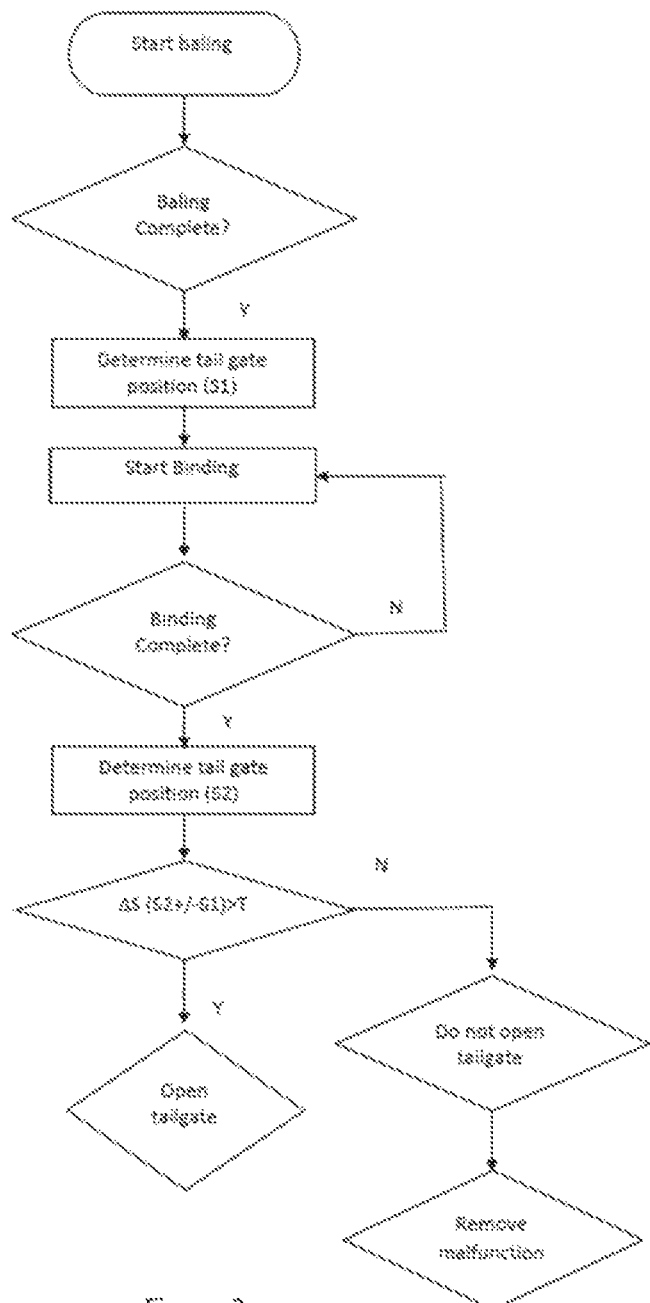
FIG. 3 illustrates a flowchart for detecting and indicating to the operator about the completion of the binding cycle.

FIG. 3 illustrates the method of operation of the round baler (12) for ensuring binding of the bale with the binding material. The operation of the round baler (12) will be described by referring to FIG. 3 and FIG. 2. After the crop material is fed into the baling chamber (16), the baling cycle is initiated. Once the baling cycle is complete, the bale thus formed exerts a pressure of the tailgate (22). This causes the tailgate to be displaced slightly towards the opened position. The sensor (23) detects this displacement of the tailgate and determines the first tailgate position (S1).

After the completion of the baling cycle, the binding arrangement (not shown in Figure) is actuated to bind the bale with the binding material. During the binding cycle, the bale is tied into a tight bundle by securely tying the bale with the binding material. Thus, after the completion of the binding cycle, the size of the bale is compressed as compared to the size of the bale after the completion of the baling cycle. Thus, the tailgate (22) tends to move slightly towards the closed position. The sensor (23) detects this displacement of the tailgate towards the closed position and determines the second tailgate position (S2).

On receiving the signals for the first tailgate position (S1) and the second tailgate position (S2), the controller (24) processes the signals to determine a tailgate position change (ΔS). Thereafter, the controller (24) may further compare the tailgate position change (ΔS) with a predetermined threshold value (T), which can be greater or equal zero, to determine that the bale is securely tied by the binding material. When the tailgate position change (ΔS) is greater than the predetermined threshold value (T) or the absolute value of the position change (ΔS) is greater than zero, the controller (24) indicates the completion of the binding cycle on the indicating unit (26). Thereafter, the controller (24) triggers the actuator (28) to open the tailgate (22) so that the securely tied bale can be ejected from the baling chamber (16). Alternatively, on viewing the indication regarding completion of the binding cycle on the indicating unit (26), the operator may manually operate the tailgate (22) to the open position.

On the other hand, when the tailgate position change (ΔS) is less than the predetermined threshold value (T) or zero, the controller (24) indicates an incomplete or malfunctioned binding cycle on the indicating unit (26). In this condition, the controller (24) restricts opening the tailgate (22) by preventing triggering of the actuator (28). The operator is required to ensure that the binding arrangement is in order and make changes in the settings of the round baler (12), if required. Thereafter, the binding cycle is required to be repeated until the controller (24) determines that the tailgate position change (ΔS) is greater than the predetermined threshold value (T) or the absolute value of the position change (ΔS) is greater than zero, respectively.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A round baler, comprising:
a pick-up unit being operable to pick up crop material from the ground;
a baling chamber configured to receive the crop material from the pick-up unit;
a press device mounted within the baling chamber, the press device being operable to form a bale during a bale formation cycle;
a binding unit dispensing a binding material for binding the bale formed in a binding cycle;
a tailgate moveable between a closed position and an open position and operably displaceable by an actuator from the closed position toward the open position during a dispensing sequence to dispense the bale after the binding cycle;
a sensor configured to detect a first tailgate position after the bale formation cycle and before the binding cycle, and to detect a second tailgate position after the binding cycle and before initiating the dispensing sequence to dispense the bale;
a controller in electrical communication with and responsive to the sensor, the controller configured to define a tailgate position change as a difference between the second tailgate position and the first tailgate position;
wherein the controller is configured to determine if the tailgate position change is in a direction moving from the open position of the tailgate toward the closed position of the tailgate, or if the tailgate position change is not in a direction moving from the open position of the tailgate toward the closed position of the tailgate;
wherein the controller is configured to allow the dispensing sequence when the tailgate position change is in the direction moving from the open position of the tailgate toward the closed position of the tailgate; and
wherein the controller is configured to prevent the dispensing sequence when the tailgate position change is not in the direction moving from the open position of the tailgate toward the closed position of the tailgate.

2. The round baler of claim 1, wherein the controller is configured to indicate the tailgate position change on an indicating unit.

3. The round baler of claim 1, wherein the controller controllably triggers the actuator to enable the dispensing sequence corresponding to the tailgate position change.

4. The round baler of claim 1, wherein the controller operably controls the indicating unit to indicate that the binding cycle is complete when the tailgate position change is in the direction moving from the open position toward the closed position.

5. The round baler of claim 1, wherein the controller operably controls the indicating unit to indicate that the binding cycle is incomplete when the tailgate position change is not in the direction moving from the open position toward the closed position.

6. The round baler of claim 1, wherein the tailgate is operably opened by user intervention after completion of the binding cycle is indicated by the controller.

7. The round baler of claim 1, wherein the tailgate is automatically opened after completion of binding cycle is indicated by the controller.

8. The round baler as set forth in claim 1, wherein the controller is configured to compare an absolute value of the tailgate position change to a threshold value to determine if the absolute value of the tailgate position change is greater than the threshold value or if the absolute value of the tailgate position change is not greater than the threshold value.

9. The round baler set forth in claim 8, wherein the controller is configured to allow the dispensing sequence when the absolute value of the tailgate position change is greater than the threshold value, and to prevent the dispensing sequence when the absolute value of the tailgate position change is not greater than the threshold value.

10. The round baler set forth in claim 8, wherein the threshold value is equal to zero.

11. A method of operating a round baler, the round baler including a pick-up unit, a baling chamber, a press device, a binding unit, a tailgate moveable between a closed position and an open position, a sensor, and a controller, the method comprising:
introducing a crop material into the baling chamber from the pick-up unit;
initiating a bale formation cycle in the baling chamber, whereby a bale exhibiting a first dimension is formed;
detecting with the sensor a first tailgate position of the tailgate associated with the first dimension of the bale at the end of the bale formation cycle after formation of the bale;
initiating a binding cycle for binding the bale with a binding material, whereby the bale exhibits a second dimension after the binding cycle;
detecting with the sensor a second tailgate position of the tailgate associated with the second dimension of the bale at the end of the binding cycle;
determining a tailgate position change based on a difference between the first tailgate position and the second tailgate position;
indicating the tailgate position change in the indicating unit;
determining if an absolute value of the tailgate position change is greater than a threshold value, or if the absolute value of the tailgate position change is not greater than the threshold value;
allowing initiation of a dispensing sequence to move the tailgate from the closed position to the open position when the absolute value of the tailgate position change is greater than the threshold value; and preventing initiation of the dispensing sequence when the absolute value of the tailgate position change is not greater than the threshold value.

12. The method of claim 11, further comprising comparing the tailgate position change with respect to a direction of position change of the tailgate towards the closed position or towards the n open position of the tailgate.

13. The method of claim 11, further comprising automatically initiating the dispensing sequence after completion of the binding cycle and when the tailgate position change is greater than the threshold value.

14. The method of claim 11, further comprising communicating the completion of the binding cycle by the controller via the indicating unit, when the tailgate position change is greater than the threshold value.

15. The method of claim 11, further comprising:
controlling the indicating unit to indicate that the binding cycle is incomplete when the tailgate position change is not greater than the threshold value.

16. The method of claim 12, further comprising:
allowing initiation of the dispensing sequence to move the tailgate from the closed position to the open position when the direction of the tailgate position change is towards the closed position; and
preventing initiation of the dispensing sequence when the direction of the tailgate position change is towards the open position.

17. A round baler, comprising:
a baling chamber configured to receive a crop material;
a press device disposed within the baling chamber and operable to form the crop material into a bale during a bale formation cycle, whereby the bale exhibits a first dimension after the bale formation cycle;
a binding unit dispensing a binding material for binding the bale formed in a binding cycle, whereby the bale exhibits a second dimension after the binding cycle;
a tailgate moveable between a closed position and an open position;
a sensor configured to detect a first tailgate position associated with the first dimension after the bale formation cycle and before the binding cycle, and to detect a second tailgate position associated with the second dimension after the binding cycle and before moving the tailgate into the opened position to dispense the bale;
a controller in communication with the sensor and configured to define a tailgate position change as a difference between the second tailgate position and the first tailgate position;
wherein the controller is configured to allow movement of the tailgate into the opened position to dispense the bale when the tailgate position change is greater than a threshold value; and
wherein the controller is configured to prevent movement of the tailgate into the opened position when the tailgate position change is not greater than the threshold value.

* * * * *